July 1, 1930.  J. C. WARDEN  1,769,728
SKIVING CLAMP FOR INNER TUBES
Filed July 14, 1926   2 Sheets-Sheet 1
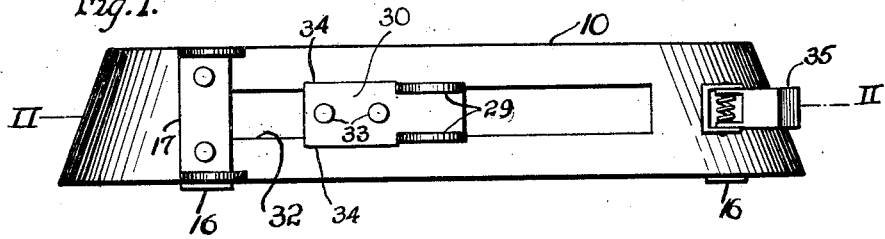
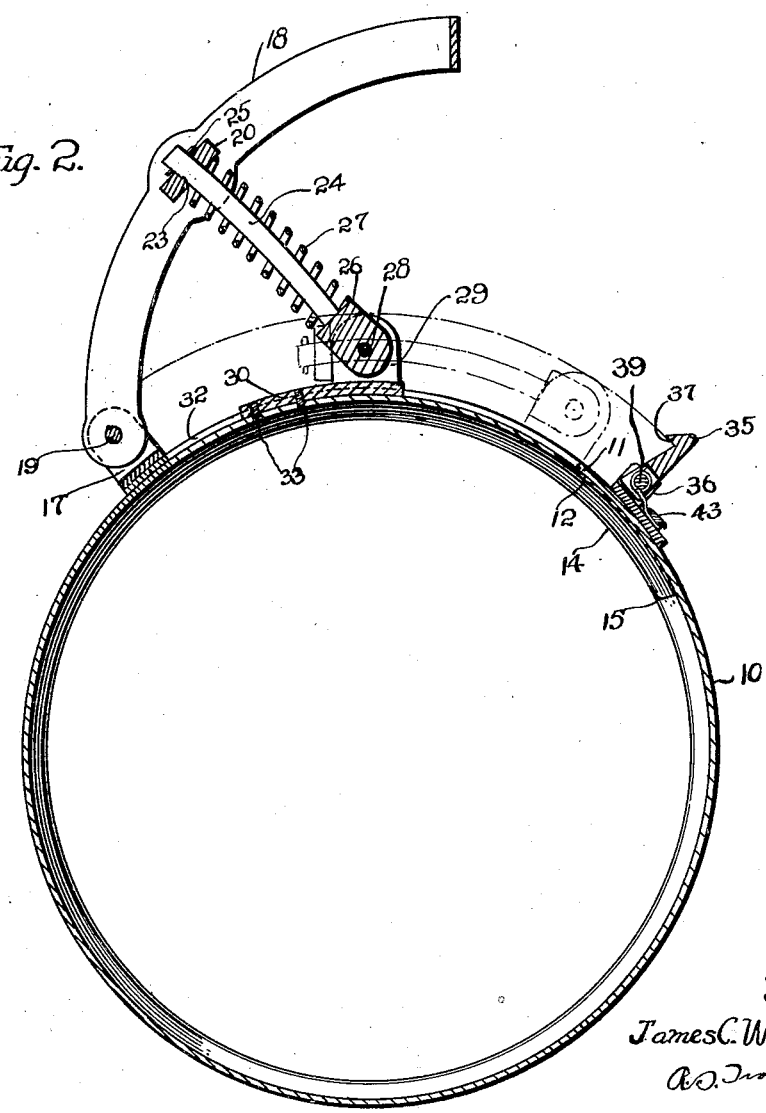
Inventor
James C. Warden.
By
Attorney July 1, 1930. J. C. WARDEN 1,769,728
SKIVING CLAMP FOR INNER TUBES
Filed July 14, 1926 2 Sheets-Sheet 2

Inventor
James C. Warden.

By

Attorney

Patented July 1, 1930

1,769,728

UNITED STATES PATENT OFFICE

JAMES C. WARDEN, OF AKRON, OHIO, ASSIGNOR TO THE GOODYEAR TIRE & RUBBER COMPANY, OF AKRON, OHIO, A CORPORATION OF OHIO

SKIVING CLAMP FOR INNER TUBES

Application filed July 14, 1926. Serial No. 122,393.

My invention relates to the manufacture of inner tubes for use in pneumatic automobile tires, and it has particular relation to a device adapted to be employed in conjunction with tubular curing-mandrels for tapering or skiving the ends of the tubes cured on such mandrels.

One object of my invention is to provide a device, which will taper the ends of inner tubes during the vulcanization thereof and which will uniformly remove the uneven edges at the ends of the tube during such vulcanization.

Another object of my invention is to provide a device which is adapted to function as a mold member to properly shape the ends of inner tubes during vulcanization thereof and which is provided with improved securing elements for assembling the device upon a tube-curing mandrel.

In the manufacture of inner tubes, a sheet or layer of uncured rubber stock is disposed about a cylindrical mandrel so as to form a tube, and thereafter the mandrel is placed within a heating chamber to vulcanize the tube. After the vulcanization process has been completed, it is necessary to strip the cured tube from the mandrel and cement or vulcanize the ends thereof together to form a complete annular inner tube.

One of the important problems in manufacturing tubes of the character designated, lies in splicing the ends of the tube. In order to provide a uniform thickness at the splice, it is necessary to taper or skive the engaging ends before they are vulcanized together. A number of methods have heretofore been employed to taper or skive the ends of tubes during vulcanization, such methods including binding the ends of the uncured tube with wrapping tape, placing beveled metal molds about the mandrel, etc.

By employing the devices heretofore known, the tubes, after they have been cured, usually are uneven at their tapered ends and, must, therefore, be trimmed before the skived ends are vulcanized together.

By the use of a clamp constructed according to my invention, the uneven edges of the tube are uniformly trimmed or cut during the curing process. This is accomplished by providing a ring or annular member, whose inner surface defines a truncated cone shape and which is provided with an annular cutting edge. The ring is not solid, but is provided with overlapping ends which slide relative to each other, and a spring pressed latch is mounted adjacent the relatively slidable end portions to bind the ring tightly upon an inner tube and mandrel. The ring is placed about the tube prior to vulcanization, the end portion of the latter extending beyond the cutting edge of the ring and after vulcanization this end portion will have been severed, leaving a thin uniformly cut and tapered extremity adapted to be spliced without further trimming.

For a better understanding of my invention, reference may now be had to the accompanying drawings forming a part of this specification, of which;

Fig. 1 is a side elevational view of a device embodying my invention, parts thereof being omitted for the sake of clearness;

Fig. 2 is a cross-sectional view illustrating the device as assembled, the section being taken substantially along the line II—II of Fig. 1;

Figure 4:
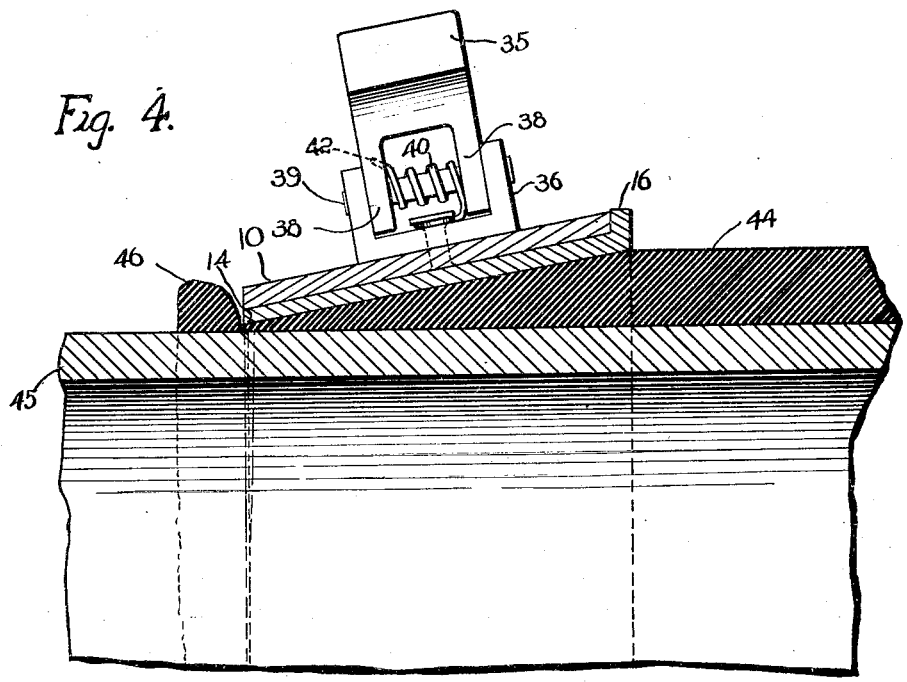
Fig. 4 is a view on a larger scale, partially in cross-section and partially in elevation, illustrating details of the device embodying my invention.
Figure 3:
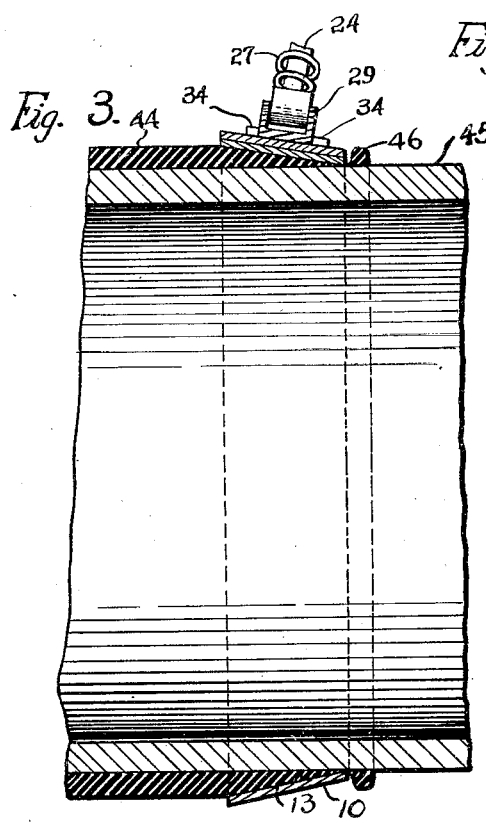
Fig. 3 is a view partially in cross-section and partially in elevation, illustrating the application of my invention to an inner tube and to a curing mandrel.

In practising my invention, I provide a ring or annular member 10, preferably composed of a relatively thin strip of resilient metal of such character that it resists rust and corrosion in the presence of steam or uncured rubber stock. Either duralumin or so-called stainless steel has been found to possess the qualities desired for manufacturing the device. The ring 10 is so constructed that two overlapping end portions 11 and 12 are adapted to slide relative to each other, the end portion 12 being tapered in order to provide a substantially continuous smooth inner annular surface. As best shown in Fig. 3, the inner surface of the ring 10, as indicated at 13, is inclined with respect to the axis thereof. The outer surface is also shown as being inclined, but it is to be understood that the ring may be so constructed that the outer surface is substantially cylindrical or any other convenient shape.

Along the inner edge of the ring, adjacent the shorter circumference thereof, an inwardly projecting relatively narrow sharp cutting edge 14 is formed, which tapers, as indicated at 15 adjacent the end 12 of the strip forming the ring. Adjacent portions of the cutting edge, as indicated at 15, fit closely against each other, thereby providing a substantially continuous annular contour. In order to maintain the overlapping ends 11 and 12 in proper alignment, upturned lugs 16 are formed on the inner overlapping portion 12, which lugs cooperate with the flanges of the cutting edge to provide guiding means.

Figure 5:
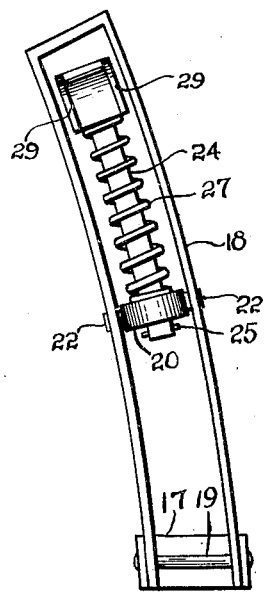
Fig. 5 is a plan view of a latch member constituting a part of the device embodying my invention.

Adjacent the extremity of the outer overlapping end portion 11, a U-shape bracket member 17 is rigidly secured and is adapted to pivotally support an elongate substantially U-shape latch member 18, the latter being pivotally supported upon a pin 19. A disc member 20 provided with integral trunnions 22 (Fig. 5) is pivoted across the arms of the U-shape latch, the disc also being provided with an opening 23, which slidably receives a rod 24. One end of the rod 24 is prevented from sliding through the disc by means of a cotter pin 25, while the other end thereof is provided with an enlarged abutment 26, which supports one end of a compression spring 27 disposed about the rod. The other end of the compression spring, which is normally under compression, rests against the disc 20. The abutment 26 is pivoted, as indicated at 28, between two radially extended ears 29 of a bracket 30, the latter being slidably disposed within a slot 32 provided along the outer end portion 11 and being rigidly secured, as indicated at 33, to the inner end portion 12. Flanges 34 on the bracket 30 provide guides adjacent the slot 32.

By pivotally moving the latch 18 about the pin 19 in a clockwise direction with respect to Fig. 2, the force of the spring 27 acting against the bracket 30 will cause the end portions 11 and 12 to slide relative to each other. When the outer end of the latch 18 has been moved until it engages the ring 10, a catch 35, mounted on the outer portion 11, engages the end of the latch and holds it in this position.

The catch 35 is mounted upon a bracket 36, of substantially U-shape, rigidly secured to the ring 10 and is provided with a notch 37, which engages and snaps over the end of the latch 18. The catch is also provided with two ears 38, which receive a pivot pin 39, secured across the U-shape bracket 36. A torsion spring 40 is mounted upon the pin 39, between the ears 38, one end of the spring being secured to the latch, as indicated at 42, while the other end thereof is secured to a rivet 43, which rigidly secures the bracket 36 to the ring. The extremities of the ears 38 are substantially flat, being slightly spaced from the surface of the bracket 36, and by engaging the latter, they operate as stops to maintain the catch 35 upright against the action of the spring 40. Thus, when the latch 18 engages the catch 35, it snaps into engagement therewith and is resiliently held in place within the notch 37.

In the operation of the device above described, an inner tube 44, which is to be cured, is disposed upon a mandrel 45 and then by moving the latch 18 to the position shown in full lines of Fig. 2, the ring is enlarged in order to facilitate placing it over the end of the mandrel. The ring is so disposed about the mandrel that a portion of the inner tube 44, as indicated at 46, extends beyond the outer end of the ring. When the latch 18 is moved to the position shown in dot and dash lines of Fig. 2, the ring is thereby contracted and drawn tightly about the inner tube. With the clamping ring in this position, the inner tube is cured or vulcanized by inserting the mandrel within a closed heater. It will be observed that the clamping action of the spring 27 continues during the vulcanization of the inner tube, and that, as the rubber is being vulcanized the sharp edge 14 cuts away the uneven end portion 46 of the inner tube, while the inclined inner surface 13 of the ring molds the end portion of the tube so as to provide a smooth-edged beveled end suitable for splicing. It is to be understood that each end of the inner tube, while being cured, is provided with a skiving device, which functions in exactly the same manner as the one just described.

From the foregoing description, it will be apparent that the practice of my invention eliminates considerable time and labor in preparing the ends of inner tubes for splicing and that the structural simplicity of the device is such that it may be manufactured relatively inexpensively. Moreover, the device, while in use, experiences very little wear and tear and will therefore function indefinitely.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A tube shaping device comprising an annular member provided with overlapping end portions, one end portion being tapered to provide a substantially smooth inner surface for the annular member, the other end portion being provided with an elongate slot, a latch secured to one of the end portions including means operative within the slot for relatively sliding the end portions, and means for securing the latch in its operative position.

2. A tube shaping device comprising an annular member, provided with overlapping end portions, one end portion being provided with an elongate slot, a latch secured to one of the end portions including means operative within the slot for relatively sliding the end portions and means for securing the latch in its operative position.

3. A tube shaping device comprising an annular member provided with overlapping end portions, one end portion being provided with an elongate slot, a bar pivoted to one of the end portions, a resilient element engaged at one end to the other end portion and slidable in the slot, and at its other end engaged to the bar, and means for locking the bar against the outer surface of the annular member.

4. A tube shaping device comprising an annular member, having an inner beveled surface provided with an inwardly extending cutting edge, said member also having overlapping end portions, one of the end portions being tapered to provide a substantially smooth inner surface for the annular member, the other end portion being provided with an elongate slot, a latch secured to one of the end portions and including means operative within the slot for sliding the end portions relative to each other, and means for securing the latch in its operative position.

In witness whereof, I have hereunto signed my name.

JAMES C. WARDEN.